(12) United States Patent
Takahashi et al.

(10) Patent No.: US 7,475,279 B2
(45) Date of Patent: Jan. 6, 2009

(54) DATA STORAGE SYSTEM, DATA STORAGE CONTROL DEVICE, AND WRITE ERROR DIAGNOSIS METHOD FOR DISKS THEREOF

(75) Inventors: Hideo Takahashi, Kawasaki (JP); Norihide Kubota, Kawasaki (JP); Hiroaki Ochi, Kawasaki (JP); Yoshihito Konta, Kawasaki (JP); Yasutake Sato, Kawasaki (JP); Tsukasa Makino, Kawasaki (JP); Mikio Ito, Kawasaki (JP); Hidejirou Daikokuya, Kawasaki (JP); Kazuhiko Ikeuchi, Kawasaki (JP); Shinya Mochizuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 505 days.

(21) Appl. No.: 11/376,183

(22) Filed: Mar. 16, 2006

(65) Prior Publication Data
US 2007/0101182 A1 May 3, 2007

(30) Foreign Application Priority Data
Oct. 28, 2005 (JP) ............................. 2005-314681

(51) Int. Cl.
*G06F 11/00* (2006.01)

(52) U.S. Cl. ............................................. 714/5; 714/42
(58) Field of Classification Search ..................... 714/5, 714/42
See application file for complete search history.

(56) References Cited

U.S. PATENT DOCUMENTS 6,968,479 B2 * 11/2005 Wyatt et al. ................... 714/53
7,103,722 B2 * 9/2006 Benveniste et al. .......... 711/134

FOREIGN PATENT DOCUMENTS

| JP | 05-166304 | 7/1993 |
| JP | 10-171608 | 6/1998 |

* cited by examiner

*Primary Examiner*—Bryce P Bonzo
(74) *Attorney, Agent, or Firm*—Staas & Halsey LLP

(57) ABSTRACT

A storage system has a plurality of disk storage devices and a controller for controlling the plurality of disk storage devices, and diagnosis of a write miss to a disk of the disk storage device. The controller for controlling the plurality of disk storage devices attaches an ID to write data, and after write access to the disk drive, the controller reads the write data from the disk drive, and compares the ID of the read data and the attached ID. The controller updates the ID for each write command. Therefore the old write data and the new write data can be identified, accurate diagnosis is possible, and the failure of an individual disk drive can be detected immediately.

20 Claims, 12 Drawing Sheets

DATA STORAGE SYSTEM, DATA STORAGE CONTROL DEVICE, AND WRITE ERROR DIAGNOSIS METHOD FOR DISKS THEREOF

CROSS-REFERENCE TO RELATED APPLICATIONS

This application is based upon and claims the benefit of priority from the prior Japanese Patent Application No. 2005-314681, filed on Oct. 28, 2005, the entire contents of which are incorporated herein by reference.

BACKGROUND OF THE INVENTION

1. Field of the Invention

The present invention relates to a data storage system used for an external storage device of a computer, data storage control device, and write error diagnosis method for the disks thereof, and more particularly to a data storage system in which many disk devices and a control device are connected via transmission paths, data storage control device, and write error diagnosis method for the disks thereof.

2. Description of the Related Art

Today as various data are computerized and handled on computers, the importance of data storage devices (external storage devices) which can store large volumes of data efficiently with high reliability, independently from a host computer which executes data processing, is increasing.

As such a disk storage device, a disk array device has many disk devices (e.g. magnetic disks, optical disks) and a disk controller to control these many disk devices, is being used. This disk array device can simultaneously accept disk access requests from a plurality of host computers, and perform control for many disks.

Such a disk array device has an internal memory which plays a role of a cache of the disk. By this, the data access time, when a read request or write request is received from the host computer, can be decreased, and higher performance can be implemented.

Generally a disk array device has a plurality of major units, that is a channel adapter which is a part connecting the host computer, a disk adapter which is a part connecting the disk drive, a cache memory, a cache control section for controlling the cache memory, and many disk drives.

If a failure occurs to a unit of the disk drive in this complicated system, the failure must be detected. One failure is that data cannot be written on the disk normally when the write command is issued to the disk drive. For example, to quicken the write speed of the disk drive, the disk drive writes the data on the disk and reports write completion without executing the read verify operation unless a special command is issued. Therefore in some cases data may not be written normally on the target track, because of the deterioration of the head or due to influence on adjacent tracks. This is called a "write miss error".

Because of this, diagnosis is required for the write data on the disk. A conventional method for this is that the control device issues a write data with attaching CRC (Cyclic Redundancy Code), to the disk drive, and the disk drive writes the write data to the disk along with the CRC. When write completion is reported, the control device reads the CRC from the disk and compares it with the CRC attached to the write data to diagnose the write error (e.g. Japanese Patent Application Laid-Open No. H5-166304).

Another prior art is that when write data is distributed and written to a plurality of disk drives which makeup a RAID configuration, time stamp information is attached to the distributed write data, and is transferred to the disk drive, and the disk drive writes the write data on the disk along with the time stamp information. When the read command for this data is received from the host, the control device reads the distributed write data from the plurality of disk drives, checks the time stamp information in the distributed write data, determines the normal time stamp information based on a majority decision, and judges the disk drive having other time stamp information as abnormal (e.g. Japanese Patent Application Laid-Open No. H10-171608).

However in the case of the former prior art, if the CRC of old data before writing the disk and that of new data happen to be the same when the new data overwrites the old data, it cannot be diagnosed whether the new data was written correctly.

Since the latter prior art is a method for detecting a failure of one disk drive based on the data of the plurality of disk drives, an individual disk drive cannot be diagnosed directly. For example, if the time stamp information of the read data of two disk drives, out of three disk drives, match, it is judged that the other one disk drive has a failure, so if a write miss error occurred to the two disk drives, then the other disk drive, which is normal, is judged as a failure.

Also since a time stamp holds write time information, the control device cannot diagnose a write miss error by comparing the time when the data was written with the present time, since the time is always different regardless whether the disk drive is normal or abnormal.

SUMMARY OF THE INVENTION

With the foregoing in view, it is an object of the present invention to provide a data storage system for performing write miss error diagnosis on an individual disk drive accurately, data storage control device, and write error diagnosis method for the disks thereof.

It is another object of the present invention to provide a data storage system for accurately executing write miss error diagnosis for an individual disk drive immediately after write, data storage control device, and write error diagnosis method for the disks thereof.

It is still another object of the present invention to provide a data storage system for detecting the write miss error of an individual disk drive immediately after write, data storage control device, and a write error diagnosis method for the disks thereof.

To achieve these objects, the data storage system of the present invention has a plurality of disk storage devices for storing data, and a storage controller which is connected to the plurality of disk storage devices via transmission paths for controlling access to the disk storage devices according to an access instruction from a host. And the storage controller has a memory for storing write data attached to a write command, and a controller for updating the ID value for each write command, inserting the ID value in a part or all of the write data and writing the data to a disk of the disk storage device. And the controller reads a part or all of the write data from the write-completed disk storage device according to the write completion of the disk storage device, stores the read data to the memory, and compares the ID value in the read data and the inserted ID value, so as to detect a write miss error of the disk storage device.

The storage control device of the present invention has a first interface section for controlling interface with a host, a second interface section for controlling interface with a plurality of disk storage devices for storing data, a controller for controlling access to the disk storage device according to the access instruction from the host, and a memory for storing write data attached to a write command. And the controller updates the ID value for each write command, inserts the ID value in a part or all of the write data, writes the data to a disk of the disk storage device, reads a part or all of the write data from the write-completed disk storage device according to the write completion of the disk storage device, stores the data to the memory, and compares the ID value in the read data and the inserted ID value to detect a write miss error of the disk storage device.

The write error diagnosis method for a disk of the present invention is a write error diagnosis method for a disk of a storage system having a controller which is connected to a plurality of disk storage devices for storing data via transmission paths and controls access to the disk storage devices according to an access instruction from a host, a first interface section for controlling interface with the host, and a second interface section for controlling interface with the plurality of disk storage devices. The method has steps of: storing write data attached to a write command to a memory; updating an ID value for each write command and inserting the ID value in a part or all of the write data; writing the ID value-inserted write data to a disk of the disk storage device; reading a part or all of the write data from the write-completed disk storage device according to the write completion of the disk storage device and storing the data to the memory; and comparing the ID value in the read data and the inserted ID value so as to detect a write error of the disk storage device.

In the present invention, it is preferable that the controller inserts the ID value in a block ID in a data block of the write data.

Also in the present invention, it is preferable that the controller inserts the ID value in a first or last block of write data to be written to the disk storage device, reads the first or last block of the write data from the write-completed disk storage device, and stores the data to the memory.

Also in the present invention, it is preferable that the controller inserts the ID value in all the blocks of write data to be written to the disk storage device, reads all the blocks of the write data from the write-completed disk storage device, and stores the data to the memory.

Also in the present invention, it is preferable that the controller has a control module for instructing write access to the disk storage device, and a disk driver module for updating the ID value for each write command according to the write access instruction, inserting the ID value in a part or all of the write data, writing the data to the disk of the disk storage device, reading a part or all of the write data from the write-completed disk storage device according to the write completion of the disk storage device, storing the data to the memory, and comparing the ID value in the read data and the inserted ID value to detect the write error of the disk storage device.

It is preferable that the present invention further has a first interface section for controlling interface with the host, and a second interface section for controlling interface with the plurality of disk storage devices and is connected with the plurality of disk storage devices by the transmission paths.

Also in the present invention, it is preferable that the controller inserts the ID value in a part or all of the write data stored to a cache area of the memory, writes the data to a disk of the disk storage device, reads a part or all of the write data from the write-completed disk storage device according to the write completion of the disk storage device, and stores the data to the data buffer area of the memory.

In the present invention, the controller attaches an ID to the write data, and after write access to the disk drive, the controller reads the write data from the disk drive and compares the ID of the read data and the attached ID. Therefore whether the write data of an individual disk drive was written by the head normally can be immediately diagnosed merely by comparing the IDs. Since the ID is updated for each write command, old write data and new write data can be identified, accurate diagnosis is possible, and a failure of a disk drive can be detected immediately.

DESCRIPTION OF THE PREFERRED EMBODIMENTS

Embodiments of the present invention will now be described in the sequence of the write miss diagnosis method for a disk of a data storage system, configuration of the data storage system, write miss diagnosis processing of a disk, and other embodiments.

Write Miss Diagnosis Method for a Disk of a Data Storage System

Figure 1:
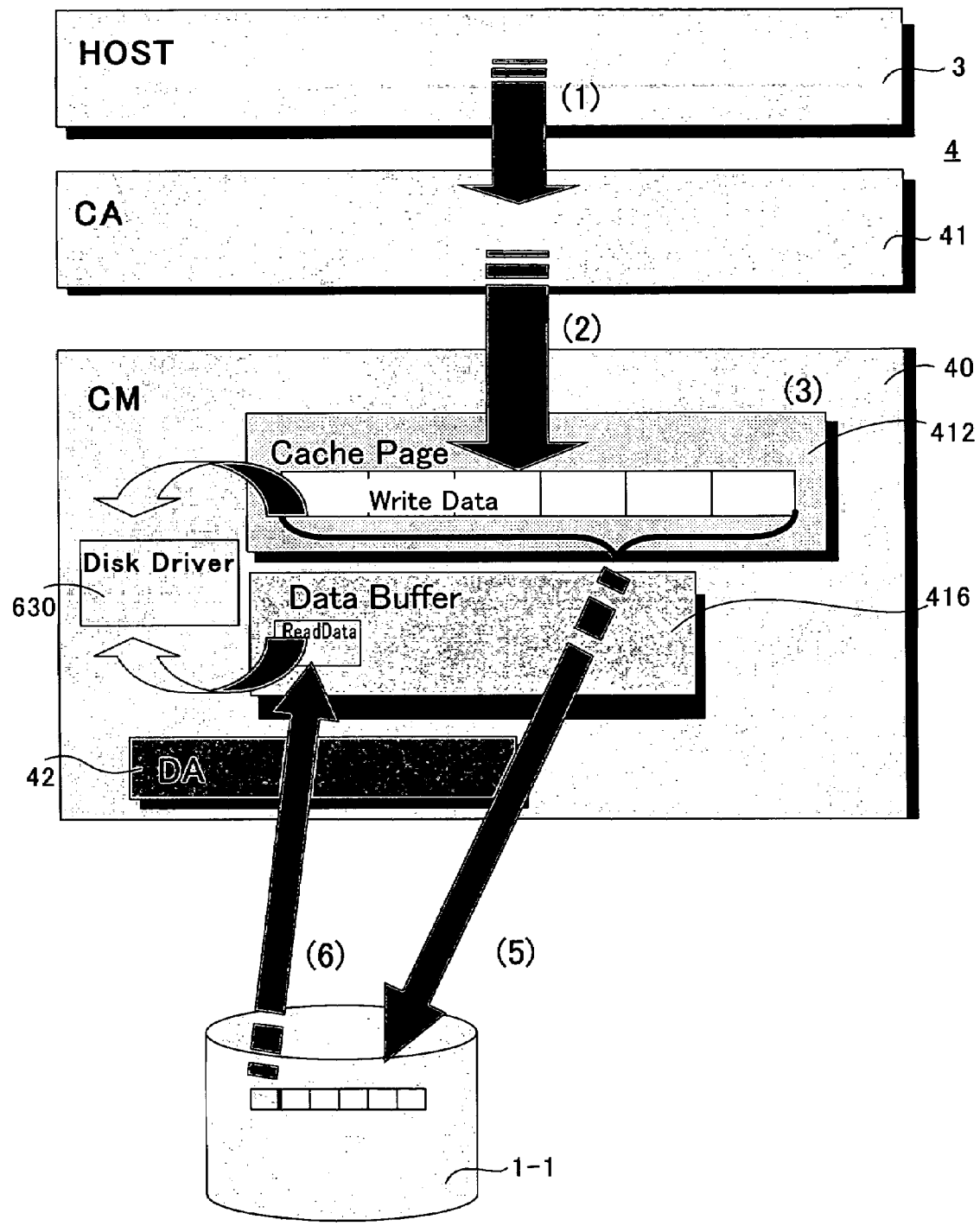
FIG. 1 is a diagram depicting a data storage system according to an embodiment of the present invention.

FIG. 1 is a diagram depicting an error diagnosis method for a disk of a data storage system according to an embodiment of the present invention. As FIG. 1 shows, the storage controller 4 has a channel adapter 41, controller 40 and disk adapter 42. The channel adapter 41 is connected to the host computer 3 via a Fiber Channel or Ethernet®. The disk adapter 42 is connected to each disk drive 1-1 in the disk enclosure (described later) by an FC loop of a Fiber Channel, for example.

In this configuration, the controller 40 has a cache memory 412, data buffer 416 and disk driver 630. And based on a request from the host 3 via the channel adapter 41 or internal write request (e.g. write back, rebuild, copy back), the controller 40 performs read or write access to the disk drive 1-1 via the disk adapter 42 through the transmission path such as a Fiber Channel.

The controller 40 attaches an ID to a part of the data of the cache memory 412, and writes the data to the disk drive 1-1 via the disk adapter 42. With the write completion of the disk drive 1-1 as a trigger, diagnosis is started.

The controller 40 reads the written data from this disk drive 1-1, and stores the read data to the data buffer 416. Then the disk driver 630 compares the ID of the write data of the cache memory 412 and the ID in the read data of the data buffer 416, to diagnosis the write miss.

Figure 2:
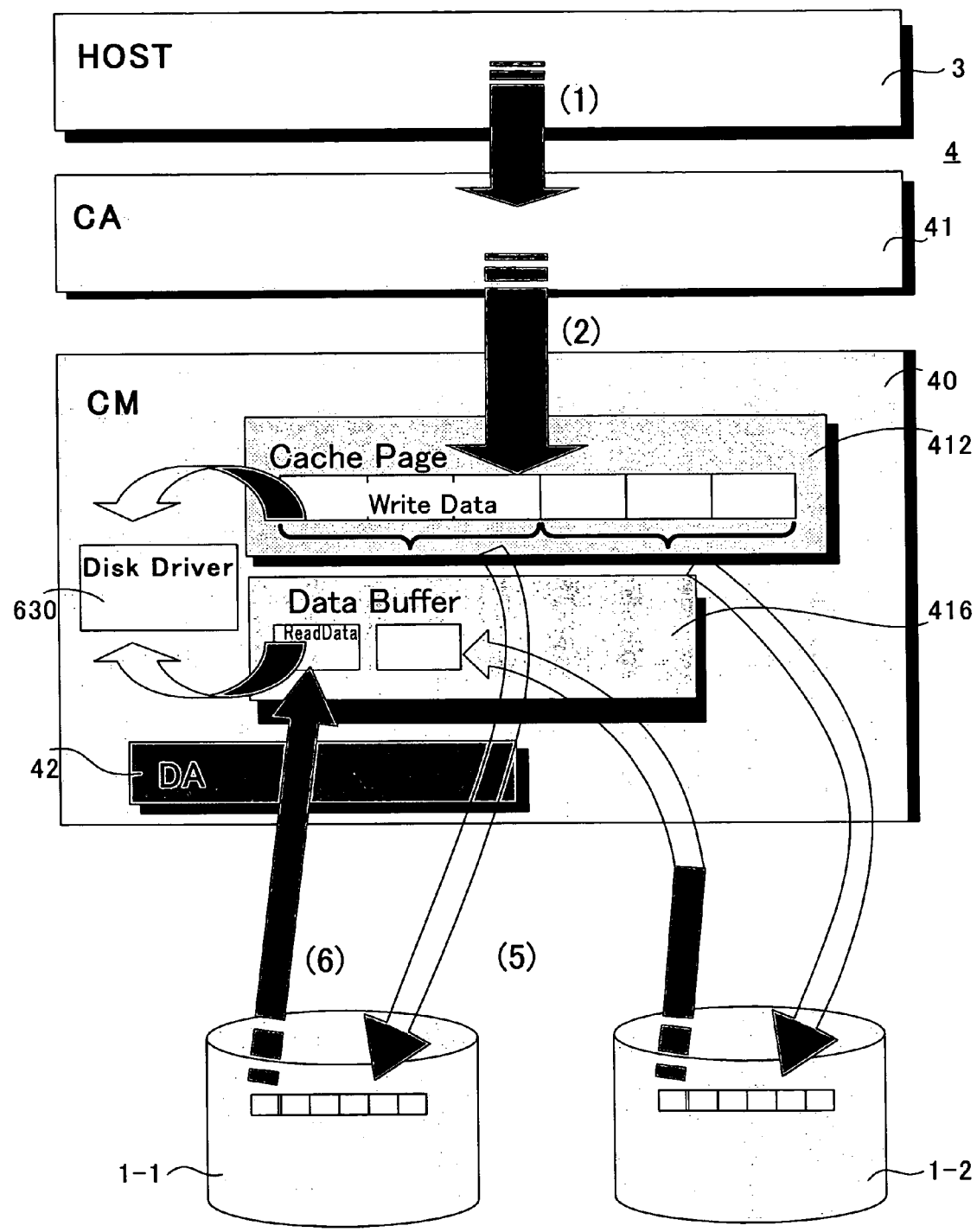
FIG. 2 is a diagram depicting a data storage system according to another embodiment of the present invention.

In the same way, the present invention can also be applied to the case of dividing and writing the write data to a plurality of disk drives, that is RAID 1, 3 and 5. FIG. 2 is a diagram depicting the error diagnosis method for a disk of the data storage device according to another embodiment of the present invention. In FIG. 2, just like FIG. 1, the storage controller 4 has a channel adapter 41, controller 40 and disk adapter 42.

In this configuration, the controller 40 has a cache memory 412, data buffer 416 and disk driver 630. And the controller 40 performs read or write access to the disk driver 1-1 through a transmission path, such as Fiber Channel, via the disk adapter 42 based on a request from the host 3 via the channel adapter 41 or internal write request (e.g. write back, rebuild, copy back).

The controller 40 divides the write data of the cache memory 412 (dividing into two in this case), attaches an ID to a part of each of the divided write data, and writes each data to the disk drives 1-1 and 1-2 via the disk adapter 42. Diagnosis is started with the write completion of the disk drives 1-1 and 1-2 as a trigger.

The controller 40 reads the written data from the disk drives 1-1 and 1-2, and stores the read data to the data buffer 416. Then the disk driver 630 compares the ID of the write data of the cache memory 412 and the ID in the read data of the data buffer 416 to diagnose the write miss.

This ID is changed for each write command. For example, an ID is specified by a counter value, which increments "1" for each write command.

In this way, the controller 40 attaches an ID to the write data and performs write access to the disk drive, then reads the write data from the disk drive and compares the ID of the read data and the attached ID. Therefore whether the write data of an individual disk drive was written normally can be immediately diagnosed merely by comparing IDs. Since an ID is updated for each write command, old write data and new write data can be identified, accurate diagnosis is possible, and the failure of a disk drive can be detected immediately.

Configuration of Data Storage System

Figure 3:
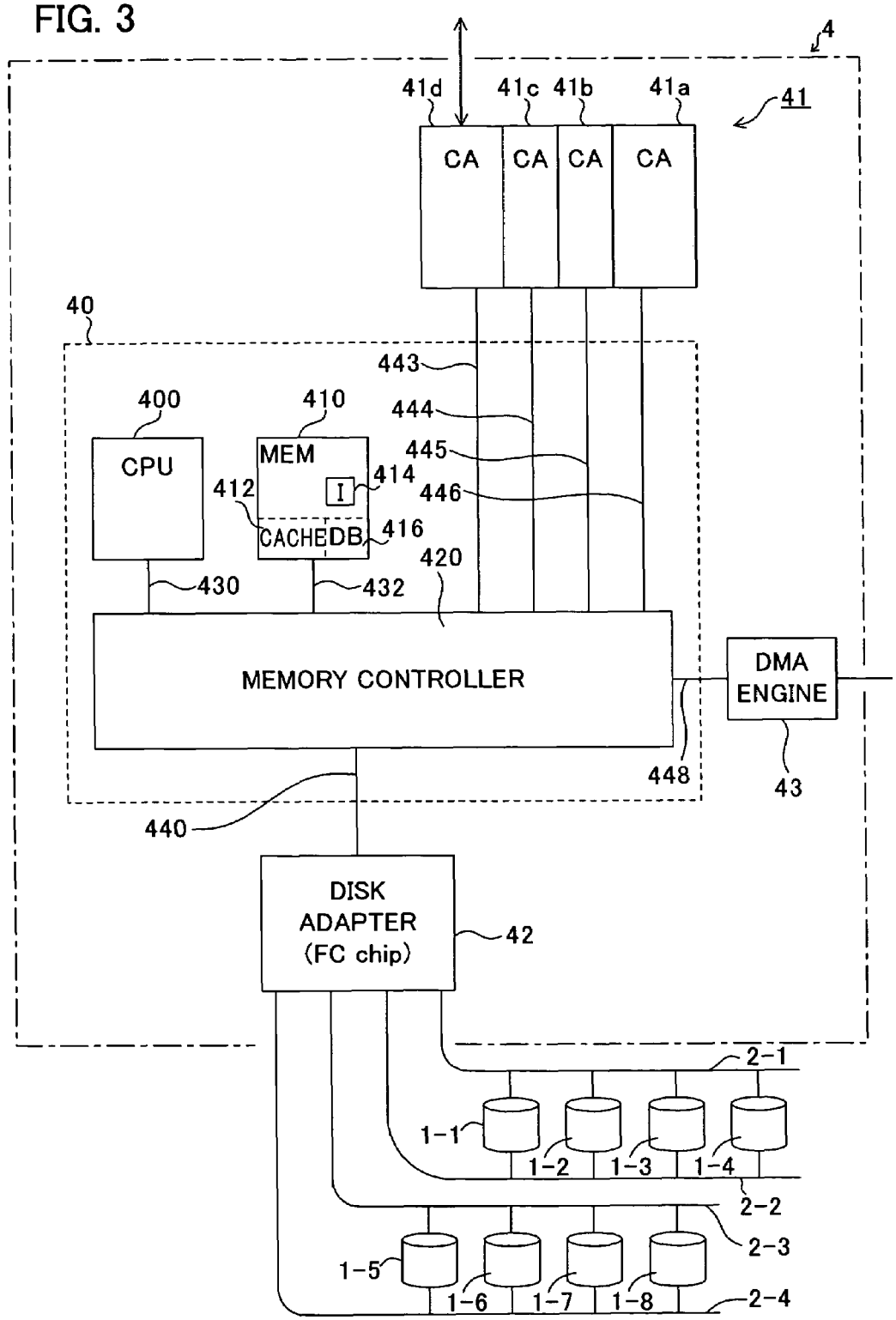
FIG. 3 is a block diagram depicting the storage controller in FIG. 1 and FIG. 2.
Figure 4:
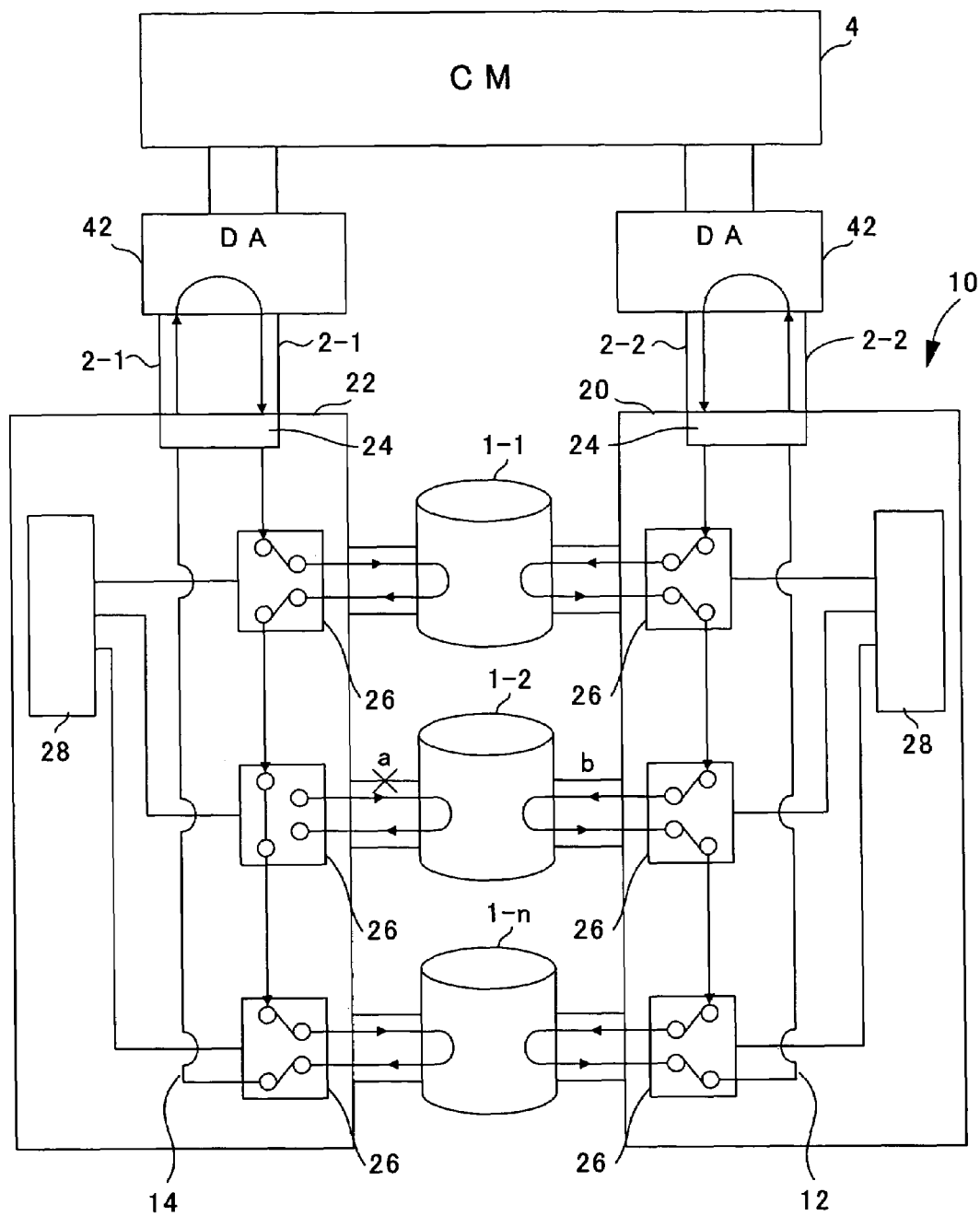
FIG. 4 is a block diagram depicting the transmission paths and disk enclosures in FIG. 1 to FIG. 3.

FIG. 3 is a block diagram depicting the storage controller in FIG. 1 and FIG. 2, and FIG. 4 is a block diagram depicting the FC loop and the disk drive group in FIG. 1 and FIG. 2.

As FIG. 3 shows, the controller 40 performs read/write processing based on the processing request from the host computer and the internal processing request (read request or write request), and has a memory 410, processing unit 400 and memory controller 420.

The memory 410 has a cache area 412 which plays a role of cache for a plurality of disks for holding a part of data held in a plurality of disk drives of the disk enclosures 20 and 22, described in FIG. 4, a data buffer 416 and ID counter 414.

The processing unit 400 controls the memory 410, channel adapter 41, device adapter 42 and DMA 43. For this, the processing unit 400 has one or more (one in FIG. 3) CPU 400 and a memory controller 420. The memory controller 420 controls the read/write of the memory 410 and switches the paths.

The memory controller 420 is connected to the memory 410 via the memory bus 432, and is connected to the CPU 400 via the CPU bus 430, and the memory controller 420 is also connected to the disk adapter 42 via the four lane high-speed serial bus (e.g. PCI-Express) 440.

In the same way, the memory controller 420 is connected to the channel adapter 41 (four channel adapters 41a, 41b, 41c and 41d in this example) via the four lane high-speed serial buses (e.g. PCI-Express) 443, 444, 445 and 446, and is connected to the DMA 43 via the four lane high-speed serial bus (e.g. PCI-Express) 448.

The high-speed serial bus, such as PCI-Express, communicates in packets, and by installing a plurality of lanes of the serial bus, communication with low delay and fast response speed, that is, with low latency, becomes possible, even if the number of signal lines is decreased.

The channel adapters 41a to 41d interface with the host computer, and the channel adapters 41a to 41d are connected to different host computers respectively. It is preferable that the channel adapters 41a to 41d are connected to the interface section of the corresponding host computer respectively via a bus, such as Fiber Channel or Ethernet®, and in this case an optical fiber or coaxial cable is used as the bus.

Each of these channel adapters 41a to 41d is a part of the storage controller 4. Each of these channel adapters 41a to 41d supports a plurality of protocols as the interface section between the corresponding host computer and the controller 40.

Since the protocol to be installed is different depending on the corresponding host computer, each channel adapter 41a to 41d is mounted on a printed circuit board different from that of the controller 40, so as to be easily replaced when necessary.

For example, a protocol with the host computer to be supported by the channel adapters 41a to 41d is iSCSI (internet Small Computer System Interface) which supports Fiber Channel or Ethernet®.

Each channel adapter 41a to 41d is directly connected with the controller 40 by a bus 443 to 446, designed for connecting an LSI (Large Scale Integration) and a printed circuit board, such as a PCI-Express bus. By this, high throughput, which is required between each channel adapter 41a to 41d and the controller 40, can be implemented.

The disk adapter 42 interfaces with each disk drive of the disk enclosure, and has four FC (Fiber Channel) ports in this example.

As mentioned above, the disk adapter 42 is directly connected to the controller 40 by a bus which is designed to connect with an LSI (Large Scale Integration) and a printed circuit board, such as a PCI-Express bus. By this, high throughput, required between the disk adapter 42 and the controller 40, can be implemented. The DMA engine 43 is for mutually communicating with other control modules 40, and is used for mirroring processing, for example.

The transmission paths and the disk drive group will now be described with reference to FIG. 4. In FIG. 4, the disk adapter 42, having four FC ports, is divided into two. As FIG. 4 shows, the disk enclosure 10 comprises a pair of fiber channel assemblies 20 and 22, and a plurality of magnetic disk devices (disk drives) 1-1 to 1-n.

Each of the plurality of magnetic disk devices 1-1 to 1-n is connected to a pair of fiber channel loops 12 and 14 via the fiber switch 26. The fiber channel loop 12 is connected to a device adapter 42 of the controller by the fiber channel connector 24 and the fiber cable 2-2, and the fiber channel loop 14 is connected to the other device adapter 42 of the controller by the fiber channel connector 24 and the fiber cable 2-1.

As mentioned above, both device adapters 42 are connected to the controller 40, so the controller 40 can access each magnetic disk device 1-1 to 1-$n$ from both routes via the device adapter 42 and the fiber channel loop 12 (route 'a'), and the other route via the device adapter 42 and the fiber channel loop 14 (route 'b').

On both fiber channel assemblies 20 and 22, the disconnection control section 28 is disposed. One disconnection control section 28 controls the disconnection (bypass) of each fiber switch 26 of the fiber channel loop 12, and the other disconnection control section 28 controls the disconnection (bypass) of each fiber switch 26 of the fiber channel loop 14.

For example, if port a at the fiber channel loop 14 side of the magnetic disk device 1-2 cannot be accessed, as FIG. 4 shows, the disconnection control section 28 switches the fiber switch 26 at the port 'a' side of the magnetic disk device 1-2 to bypass status, as FIG. 4 shows, so as to disconnect the magnetic disk device 1-2 from the fiber channel loop 14. By this, the fiber channel loop 14 can function normally, and the magnetic disk device 1-2 can access port 'b' at the fiber channel loop 12 side.

Each magnetic disk device 1-1 to 1-$n$ has a pair of FC (Fiber Channel) chips to connect to port 'a' and port 'b' respectively, a control circuit and a disk drive mechanism. This FC chip has a CRC check function.

Here the disk drives 1-1 to 1-4 in FIG. 3 correspond to the magnetic disk devices 1-1 to 1-$n$ in FIG. 4, and the transmission paths 2-1 and 2-2 correspond to the fiber cables 2-1 and 2-2 and the fiber channel assemblies 20 and 22. The disk drives 1-5 to 1-8 and the transmission paths 2-3 and 2-4 in FIG. 3 correspond in the same way.

Figure 5:
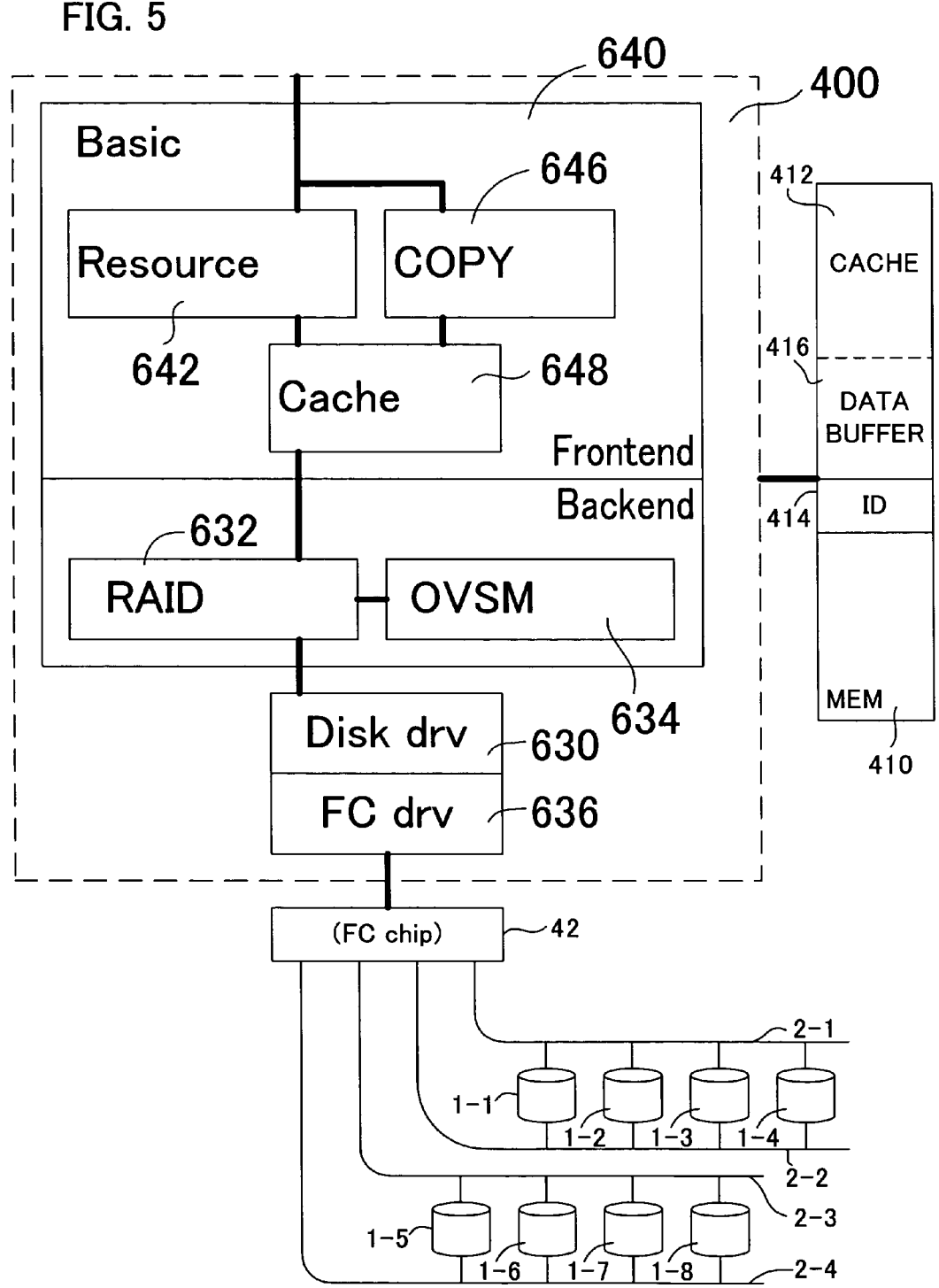
FIG. 5 is a block diagram depicting the software module of the controller in FIG. 3.
Figure 6:
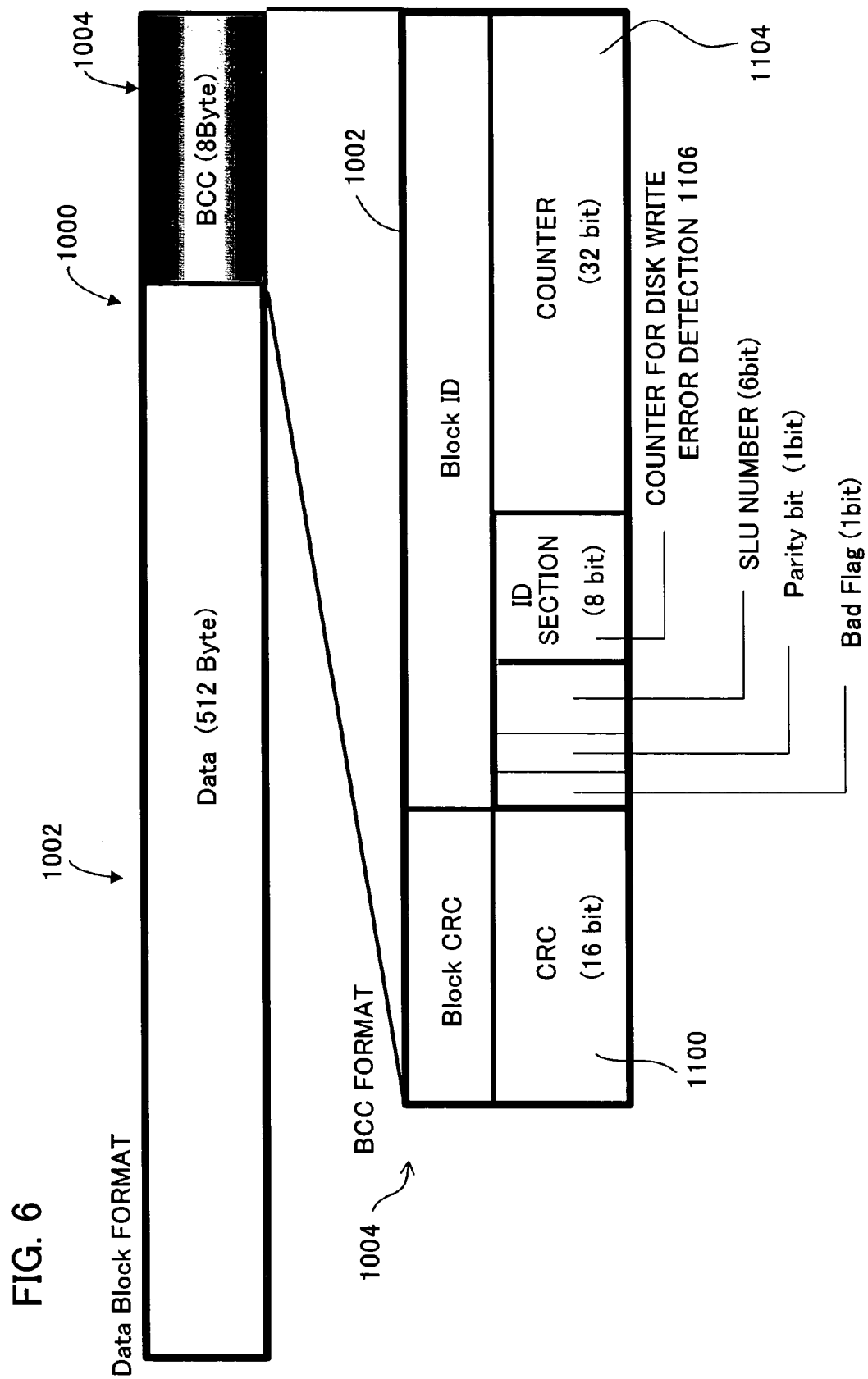
FIG. 6 is a diagram depicting the format of the data block of the write data in FIG. 3 and FIG. 5.

Now the program module (thread) of the software to be executed by the CPU 400 (410) will be described. FIG. 5 is a block diagram depicting the thread of the software to be executed by the CPU 400 (410), and FIG. 6 is a diagram depicting the data block format thereof.

As FIG. 5 shows, the software module has a kernel/scheduler and an IO control module, which are not illustrated. The kernel/scheduler is an operating system, such as MS-DOS®. The IO control module has a basic module 640, CM-DA driver, that is a disk driver 630 and an FC driver 636.

The basic module 640 has a front end which has a resource thread for managing resources (resource control module) 642, a copy thread for performing copy processing (copy control module) 646, and a cache thread for controlling the cache memory 412 of the memory 410 (cache memory control module) 648, and a back end which has a RAID thread for controlling the RAID configuration (RAID control module) 632, and an OVSM thread (OVSM control module) 634.

The OVSM thread 634 performs rebuild/copy back processing. The disk driver 630 and the FC driver 636 are drivers for driving the DA (disk adapter) 42 comprised of the FC (Fiber Channel) chip.

The resource module 642 and the RAID module 632 refer to the configuration definition table, and converts the LUN (Logical Unit Number) from the host to PLBA (Physical Block Address) of the physical disk, and accesses the physical disk 1-1, for example.

As FIG. 5 shows, the OVSM thread 634 manages the progress of rebuild/copy back. When the host I/O request is received, and if it is read access, the cache module 648 judges whether the target data is stored in the cache memory 412, and if stored (cache hit), the cache module 648 transfers the target data to the host, and if not stored (cache miss hit), the cache module 648 issues the read request to the RAID control module 632.

When the host I/O request is received, and if it is write access, the cache module 648 stores the write data to the cache memory 412. Then the cache module 648 issues the write request (write back) of the write data of the cache memory 412 to the RAID control module 632.

Then the RAID control module 632 acquires the buffer for temporarily saving data (hereafter data buffer), and instructs the disk driver 630 to read or write according to the RAID configuration definition. In the case of write access to the disk, the disk driver 630 writes the counter value ID to a part of the counter for disk write miss detection of BID (Block ID) on at least the first LBA (LBA0) of the data to be written to the disk drive.

As FIG. 6 shows, the data block is comprised of the data section 1002 and the BCC (Block Check Code) section 1004. For example, if the data section 1002 of one block is 512 bytes, 8 bytes are allocated to the BCC section 1004. The BCC section 1004 is comprised of the block CRC (Cyclic Redundancy Code) section 1100 and the block ID section 1102.

6 bytes are allocated to the block ID section 1102, which is comprised of 4 bytes (32 bits) of the counter value (block number) and the remaining 2 bytes. Of these 2 bytes, 1 byte is allocated to the counter ID section 1106 for disk write miss detection, and the remaining 1 byte is allocated to the SLU (host Logical Unit) number, parity bit and bad flag.

In other words, the ID for disk write miss detection 1106 is allocated to the reserve area of the block ID section 1102. And the disk driver 630 directly writes the ID value of the ID section 414 of the memory 410 to the counter ID section 1106 of the block data of the cache memory 410.

Then the disk driver 630 performs the later mentioned write miss diagnosis. By this configuration, the ID value, which is updated for each write command, is written to the counter ID section 1106 of the BID section 1102 of at least the first data block 1000 of the write data to be written to each disk drive, and the data is written to the disk drive.

Then diagnosis is started, at least the first block of the write data written from the disk drive is read, the contents of the counter ID section 1106 in the read block and the ID value of the ID section 414 of the memory 410 are compared to judge the presence of a write miss.

Disk Write Error Diagnosis Processing

Figure 7:
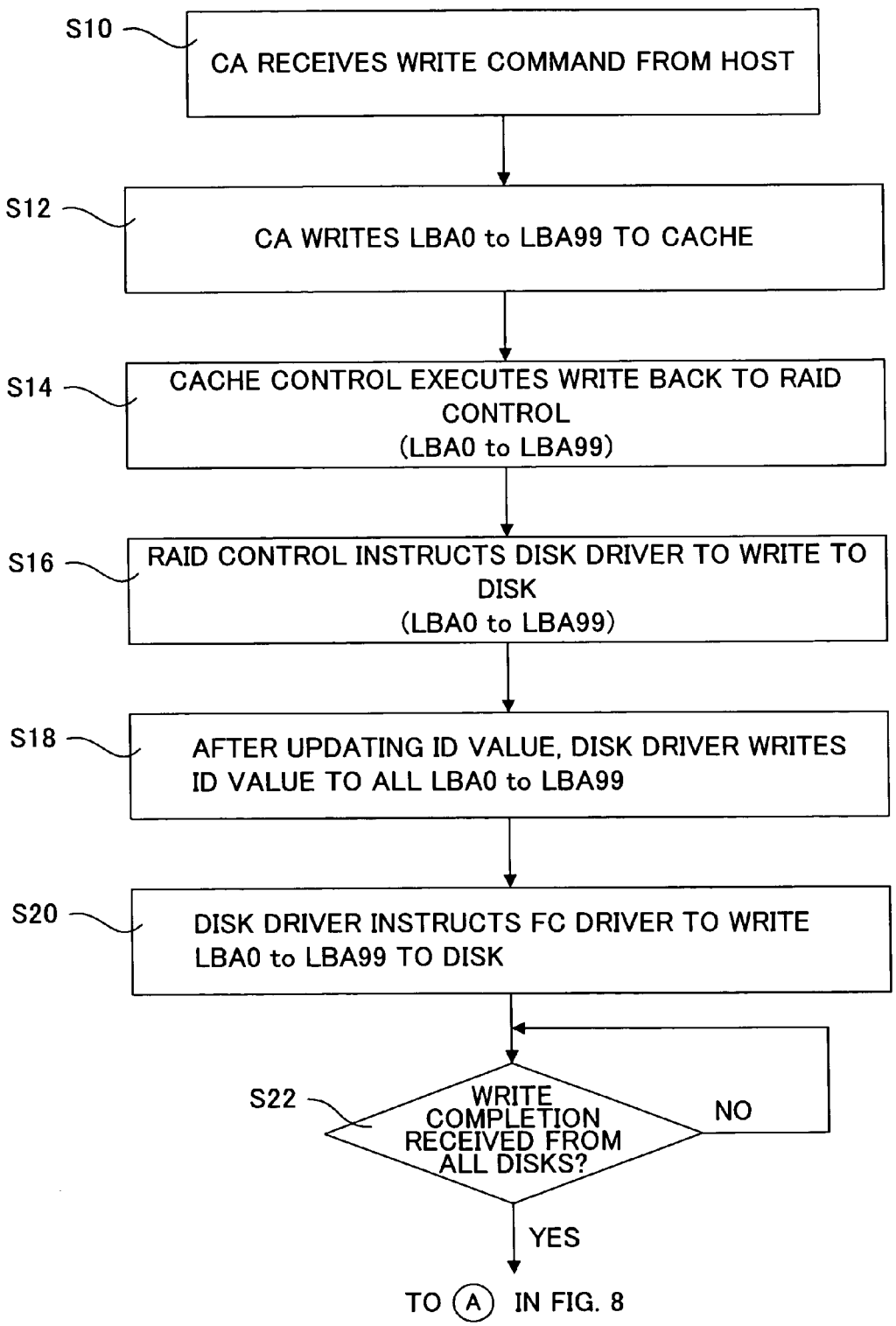
FIG. 7 is a first flow chart depicting the disk write error diagnosis processing according to an embodiment of the present invention.
Figure 8:
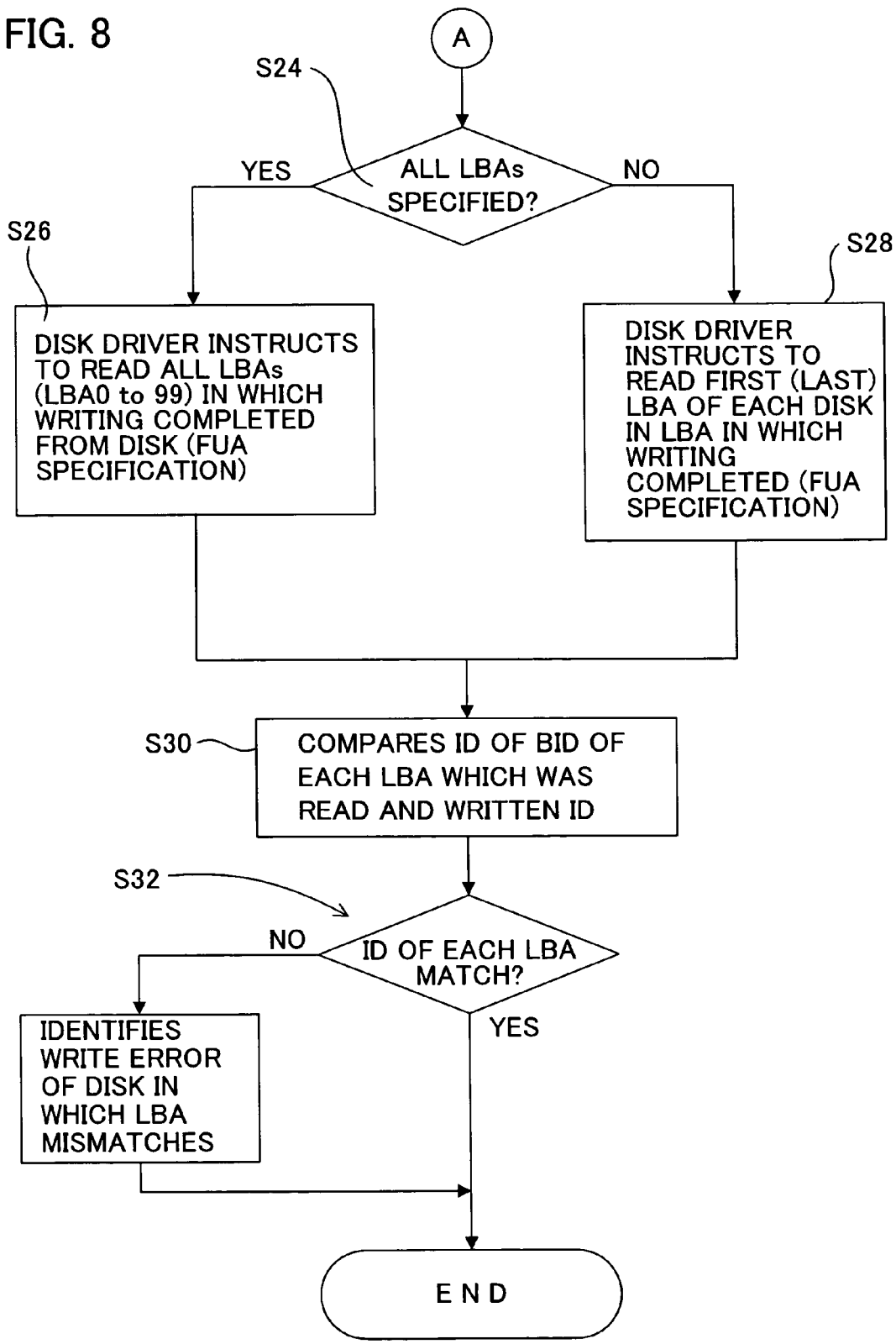
FIG. 8 is a second flow chart depicting the disk write error diagnosis processing according to an embodiment of the present invention.

Now the disk write error diagnosis processing for the data storage system in FIG. 1 to FIG. 6 will be described. FIG. 7 and FIG. 8 are flow charts depicting the disk write error diagnosis processing according to an embodiment of the present invention, and FIG. 9 to FIG. 12 are diagrams describing the operation thereof.

(S10) The corresponding channel adapter 41*a* to 41*d* receives a write command from the host computer.

(S12) The channel adapter 41 writes the write data LBA0 to LBA99 to be attached to the write command to the cache memory 412. Here the write data is described as 100LBA.

(S14) The cache control module 648 instructs the RAID control module 632 to write back the target data LBA0 to LBA99 held in the cache memory 412.

(S16) The RAID control module 632 instructs the disk driver 630 to write (LBA0 to 99) to the disk drive according to the RAID configuration definition. At this time, the RAID control module 632 transfers the PLU (physical disk unit number), LBA position, physical address of the user data and length of user data, which are required to write to the disk, to the disk driver 630, according to the RAID configuration definition.

(S18) The disk driver 630 updates (increments "1") the counter value 414 of the memory 410, then writes the counter value 414 of the memory 410 to the ID section for disk write miss detection 1106 of the BID section 1102 for the first LBA (e.g. LBA0) or all the LBAs of the write data to be written to each disk of the cache memory 412. The disk driver 630 performs memory map processing and directly changes the value of the ID section 1106 of the BCC section 1104 of the user data of the memory 410.

(S20) Then the disk driver 630 instructs the FC driver 636 to write data of write data LBA0 to LBA99 to the disk of the disk drive. By this, to be described in FIG. 9 to FIG. 12, the write data is directly written to the disk of the specified disk drive 1-1 (or 1-1, 1-2, 1-3) via the disk adapter 42.

(S22) The disk driver 630 judges whether a write completion report was received from the specified disk drive via the disk adapter 42.

(S24) When the write completion report is received from the specified disk drive, the disk driver 630 starts diagnosis. Here it can be specified whether the diagnosis target is all the LBAs or the first LBA (or last LBA). This specification is set from the outside (e.g. maintenance device connected to the controller 4) in advance. The disk driver 630 judges whether the diagnosis target is all of the LBAs or not (first LBA or last LBA).

(S26) If all the LBAs are specified, the disk driver 630 instructs the FC driver 636 to read all the LBAs (LBA0 to LBA99) specified in step S18 from the specified disk drive. At this time, the FUA (Force Unit Access) flag in the command format of SCSI (Small Computer System Interface)–2 is set, and the disk medium in the disk drive is directly accessed. In other words, in the case of a device in which the cache memory is mounted on the disk drive, read operation is performed by accessing the cache memory when a read command is received, so the disk driver 630 instructs the FC driver 636 to read the data directly from the disk, preventing access to the cache memory. By this, as will be described in FIG. 9 and FIG. 10, the data is read from the disk of the specified disk drive 1-1 (or 1-1, 1-2, 1-3) via the disk adapter 42.

(S28) If all the LBAs are not specified, the first or the last LBA is diagnosed. For this, the disk driver 630 instructs the FC driver 636 to read the first LBA (or last LBA) of the write data of one or each disk drive out of all the LBAs (LBA0 to LBA99) specified in step S18, from the specified disk drive. At this time, the FUA (Force Unit Access) flag of the command format of SCSI (Small Computer System Interface)–2 is set, and the disk medium of the disk drive is directly accessed. In other words, in the case of a device in which the cache memory is mounted on the disk drive, read operation is performed by accessing the cache memory when a read command is received, so the disk driver 630 instructs the FC driver 636 to read the data directly from the disk, preventing access to the cache memory. By this, to be described in FIG. 11 to FIG. 12, the data is read from the disk of the specified disk drive 1-1 (or 1-1, 1-2, 1-3) via the disk adapter 42.

(S30) The LBAs which were read are stored in the data buffer 416, and the disk driver 630 first checks the read block by CRC 1100 of the read data. If a CRC error is detected, the disk drive which sent the data with the CRC error is degraded (is not used). If a CRC error is not detected, the disk driver 630 detects the counter ID value 1106 in the BID 1004 of the read block 1000 in the data buffer 416, and compares it with the counter value 414 in the memory 40.

(S32) If the ID section 1106 of each read block (all write data or the first (last) block) which was read and the counter value 414 do not match, the disk driver 630 judges that a write miss occurred to the disk drive which sent the non-matching LBA. The disk drive which was judged as the write miss is disconnected. If the ID section 1106 of each read block (all write data or the first (last) block) which was read and the counter value 414 match, the disk driver 630 judges that a write miss did not occur, and ends the processing.

Figure 9:
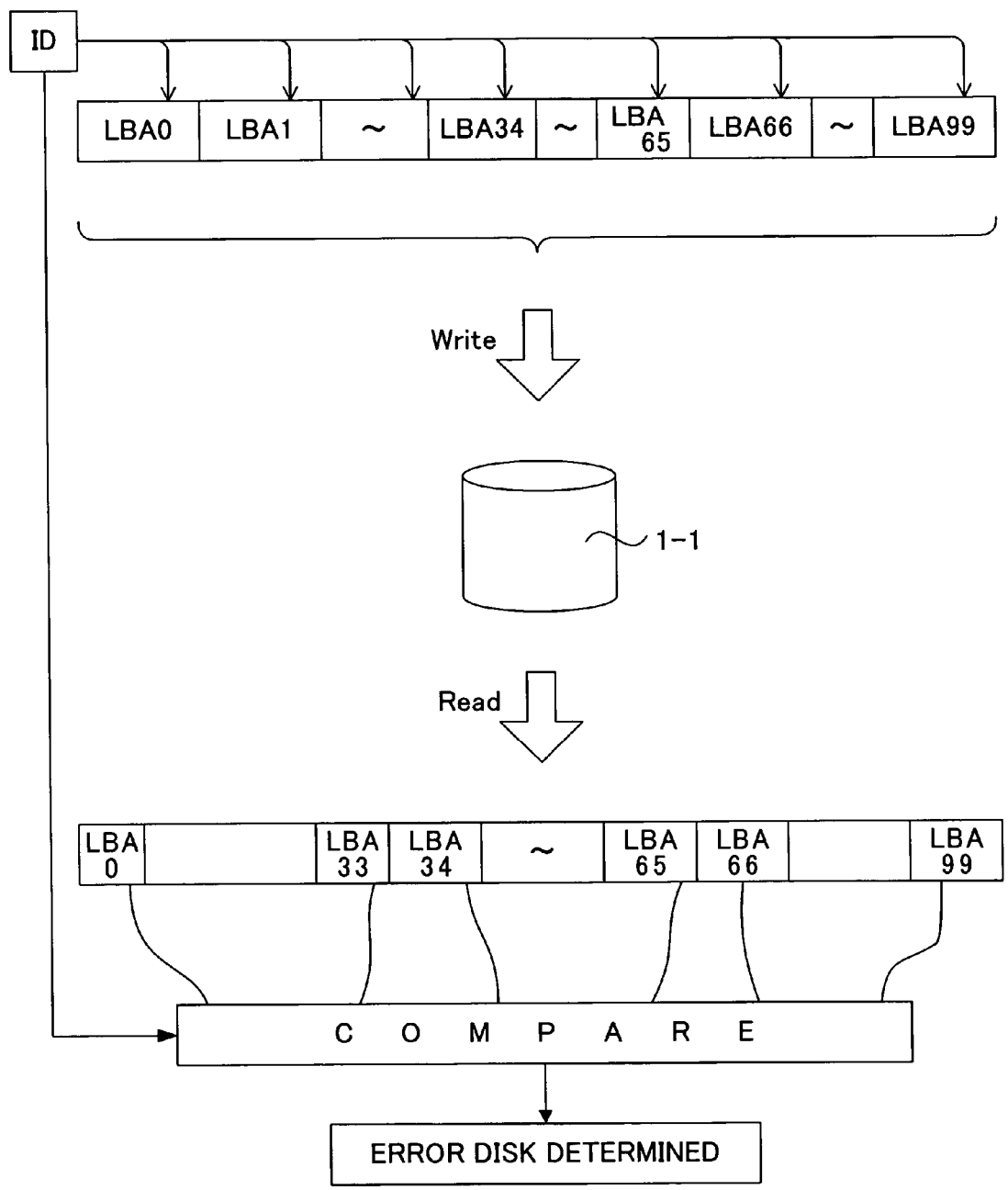
FIG. 9 is a diagram depicting the write error diagnosis processing operation according to a first embodiment of the present invention.
Figure 10:
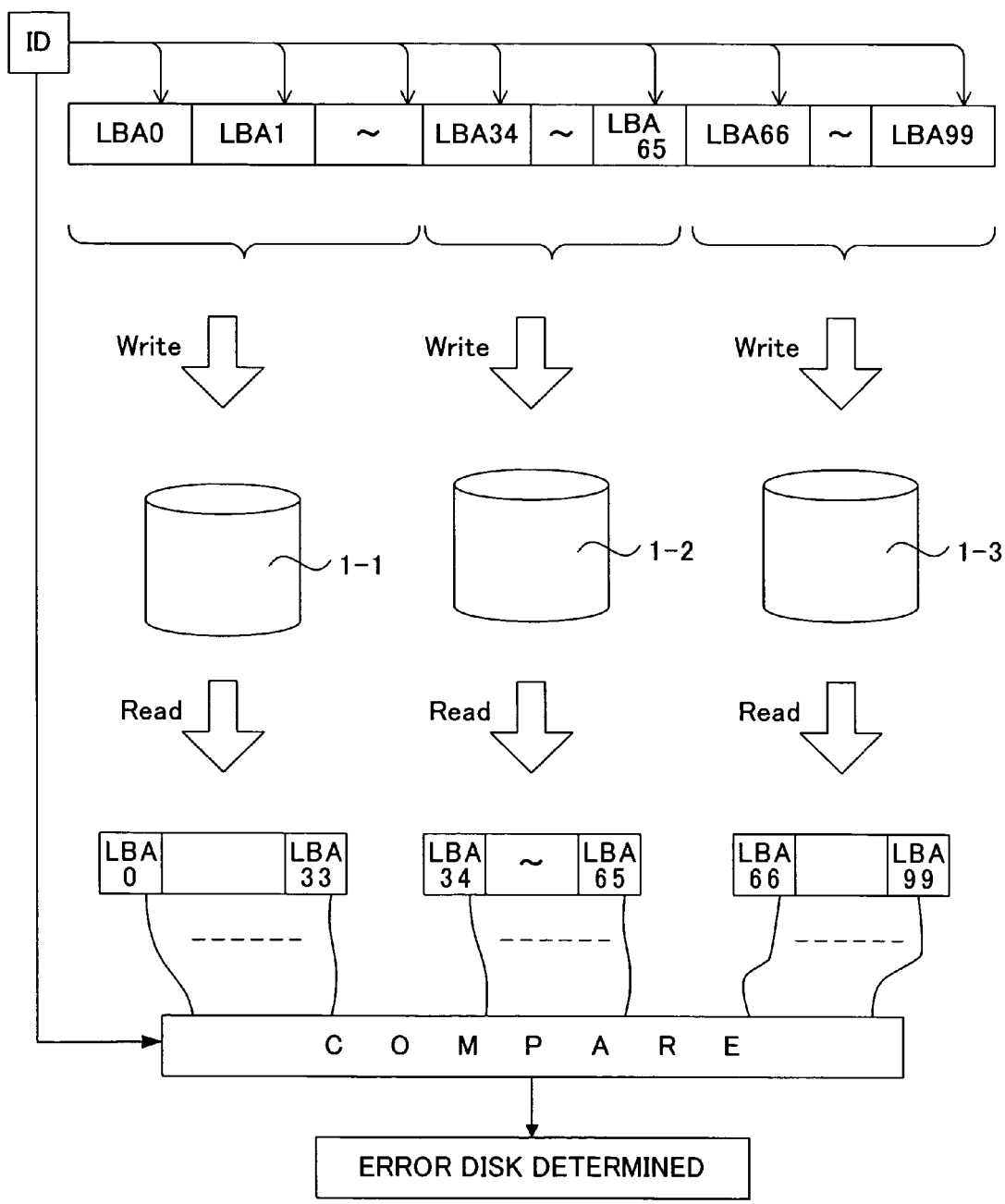
FIG. 10 is a diagram depicting the write error diagnosis processing operation according to a second embodiment of the present invention.

This processing will be specifically described with reference to FIG. 9 to FIG. 12. FIG. 9 and FIG. 10 show examples when the ID value is written to all the LBAs of the target write data. FIG. 9 shows an example when all the write data LBA00 to LBA99 are written to a single disk drive 1-1, and FIG. 10 shows an example of RAID 5, where the write data LBA00 to LBA99 are divided into three, and written to a plurality of (three in this case) of disk drives 1-1, 1-2 and 1-3.

As FIG. 9 shows, in the case of writing all the write data LBA00 to LBA99 to a single disk drive 1-1, the disk driver 630 writes the counter ID value 414 to all of LBA00 to LBA99, and writes the data to the disk of the disk drive 1-1. Then the disk driver 630 receives the write completion report from the disk drive 1-1, and reads the LBA00 to LBA99 which were written from the disk drive 1-1, and stores it to the data buffer.

And the disk driver 630 detects the counter ID value 1106 in the BID 1004 of the read block 1000 of all LBA00 to LBA99 which were read, and compares them with the counter ID value 414 of the memory 40. If the counter ID value of at least one LBA does not match the counter ID value, the disk driver 630 judges that a write miss occurred to the disk drive 1-1.

As FIG. 10 shows, in the case of RAID 5 where the write data LBA00 to LBA99 are divided into three and written to a plurality of (three in this case) disk drives 1-1, 1-2 and 1-3, the disk driver 630 writes the counter ID value 414 to all of LBA00 to LBA99, and writes LBA00 to LBA33, LBA34 to LBA65 and LBA66 to LBA99 to the disks of the disk drives 1-1, 1-2 and 1-3. Then the disk driver 630 receives the write completion report from the disk drives 1-1, 1-2 and 1-3, read the written LBA00 to LBA99 from each disk drive 1-1, 1-2 and 1-3, and stores the data to the data buffer.

And the disk driver 630 detects the counter ID value 1106 in the BID 1004 of the read block 1000 of all LBA00 to LBA99 which were read, and compares them with the counter ID value 414 of the memory 40. If the counter ID value of at least one LBA from each disk drive 1-1, 1-2 and 1-3 does not match the counter ID value, the disk driver 630 judges that a write miss occurred to the disk drive 1-1, or 1-2 or 1-3.

In this way, the counter ID value is inserted in all the blocks of the write data, and all the blocks are checked, so the previous data recorded on the disk and the data overwritten thereon can be completely checked, and a head failure of an individual disk drive and a write error, due to the influence of an adjacent track, can be completely detected regardless the kind of data.

Figure 11:
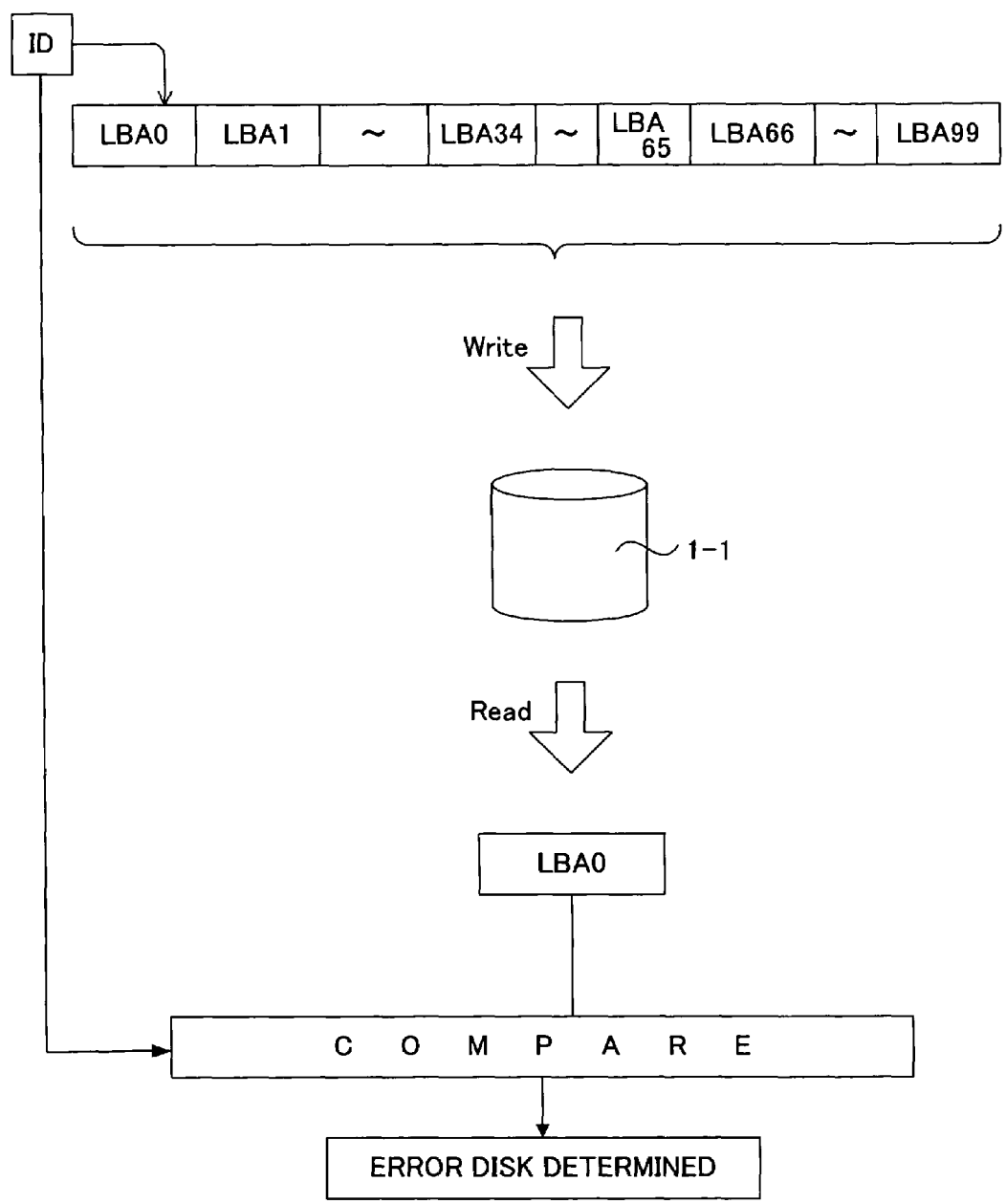
FIG. 11 is a diagram depicting the write error diagnosis processing operation according to a third embodiment of the present invention.
Figure 12:
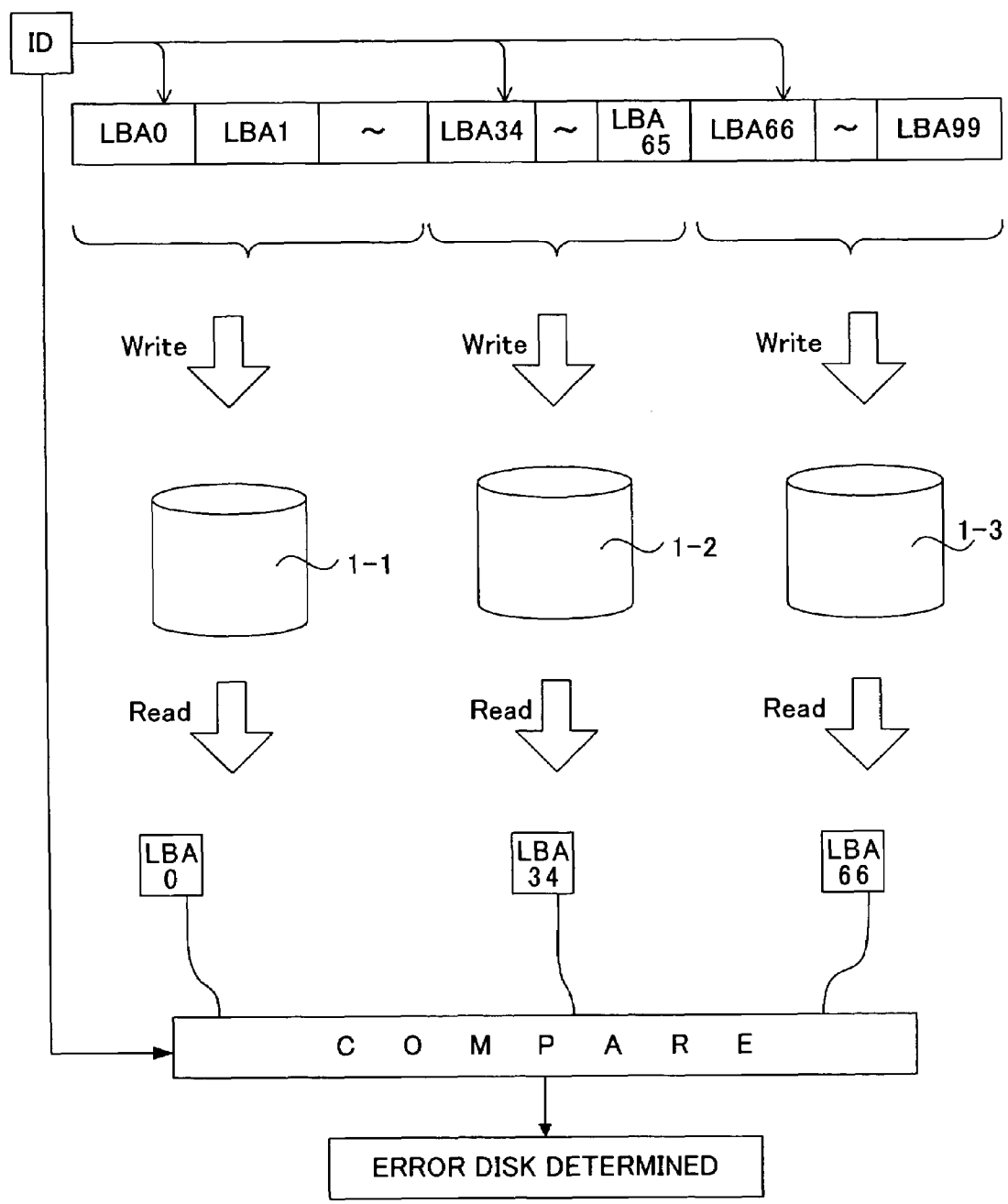
FIG. 12 is a diagram depicting the write error diagnosis processing operation according to a fourth embodiment of the present invention.

FIG. 11 and FIG. 12 are examples when an ID value is written to only the first LBA of the target write data. FIG. 11 shows an example when all the write data LBA00 to LBA99 are written to the single disk drive 1-1, and FIG. 12 shows an example of RAID 5, where the write data LBA00 to LBA99 are divided into three and written to a plurality of (three in this case) disk drives 1-1, 1-2 and 1-3.

As FIG. 11 shows, in the case of writing all the write data LBA00 to LBA99 to the single disk drive 1-1, the disk driver 630 writes the counter ID value 414 to the first LBA00, and writes the data to the disk of the disk drive 1-1. Then the disk driver 630 receives the write completion report from the disk drive 1-1, reads only the first LBA00 of the LBA00 to LBA99 which were written from the disk drive 1-1, and stores it to the data buffer.

And the disk driver 630 detects the counter ID value 1106 in the BID 1004 of the read block 1000 of the first LBA00 which was read, and compares it with the counter ID value 414 of the memory 40. If the counter ID value of this LBA does not match the counter ID value, the disk driver 630 judges that a write miss occurred to the disk drive 1-1.

As FIG. 12 shows, in the case of RAID 5, where write data LBA00 to LBA99 are divided into three and written to a plurality of (three in this case) disk drives 1-1, 1-2 and 1-3, the disk driver 630 writes the counter ID value 414 to the first LBA00, LBA34 and LBA66 which are distributed to each disk drive 1-1, 1-2 and 1-3, and writes LBA00 to LBA33, LBA34 to LBA65 and LRA66 to LBA99 to the disks of the disk drives 1-1, 1-2 and 1-3.

Then the disk driver 630 receives the write completion report from the disk drives 1-1, 1-2 and 1-3, reads only the first LBA00, LBA34 and LBA66 which were written from each disk drive 1-1, 1-2 and 1-3, and stores it to the data buffer.

And the disk driver 630 detects the counter ID value 1106 in the BID 1004 of the read block 1000 of the first LBA00, LBA34 and LBA66 which were read, and compares them with the counter ID value 414 of the memory 40. If the counter ID value of the LBA from each disk drive 1-1, 1-2 and 1-3 does not match with the counter ID value, the disk driver 630 judges that the write miss occurred to the disk drive 1-1 or 1-2 or 1-3.

In this way, the counter ID value is inserted in the first block of the write data and the first block is checked, so the previous data recorded on the disk and the data overwritten thereon can be checked, and a head failure of an individual disk drive and a write error, due to the influence of an adjacent track, can be detected. The speed of checking is faster than the case of FIG. 9 and FIG. 10, since the number of locations in which the ID value is inserted is less, and the number of read blocks is also less.

OTHER EMBODIMENTS

In the above embodiments, the ID value is inserted in the first LBA, but the ID value may be inserted in the last LBA. When a plurality of write operations are executed in parallel, the inserted counter ID value may be stored corresponding to the write data, so that write completion of the write data is received and the write data is read, and is compared with the stored corresponding counter ID value.

Also as described in the write back operation, the present invention can be applied to the write operation for copying redundant data for redundant control, and to the write operation for rebuild and copy back.

The number of channel adapters and disk adapters in the storage controller may be increased or decreased according to necessity. For the disk device, such a storage device as a hard disk drive, optical disk drive and magneto-optical disk drive may be used. And the configuration of the storage system and the controller (control module) can be applied not only to the configuration in FIG. 3, FIG. 4 and FIG. 5, but to other configurations.

The present invention has been described using embodiments, but the present invention can be modified in various ways within the scope of the essential character of the present invention, and these variant forms shall not be excluded from the scope of the present invention.

The controller attaches an ID to the write data, and after performing write access to the disk drive, the controller reads the write data from the disk drive and compares the ID of the read data and the attached ID. Therefore whether the write data of an individual disk drive was written normally by a head can be immediately diagnosed merely by comparing the IDs. Since an ID is updated for each write command, the old write data and the new write data can be identified, accurate diagnosis is possible, and the failure of a disk drive can be detected immediately.

What is claimed is:

1. A data storage system, comprising:
    a plurality of disk storage devices for storing data; and
    a storage controller which is connected to said plurality of disk storage devices via transmission paths for controlling access to said disk storage devices according to an access instruction from a host,
    wherein said storage controller comprises:
    a memory for storing write data attached to a write command; and
    a controller for updating an ID value for each write command, inserting the ID value in a part or all of said write data, and writing the data to a disk of said disk storage device, and
    wherein said controller reads a part or all of said write data from said write-completed disk storage device according to said write completion of said disk storage device, stores the data to said memory, and compares the ID value in said read data and said inserted ID value, to detect a write miss of said disk storage device.

2. The data storage system according to claim 1, wherein said controller inserts said ID value in a block ID in a data block of said write data.

3. The data storage system according to claim 1, wherein said controller inserts said ID value in at least one of a first and last block of write data to be written to said disk storage device, reads the first or last block of said write data from said write-completed disk storage device, and stores the data to said memory.

4. The data storage system according to claim 1, wherein said controller inserts said ID value in all the blocks of write data to be written to said disk storage device, reads all the blocks of said write data from said write-completed disk storage device, and stores the data to said memory.

5. The data storage system according to claim 1, wherein said controller comprises:
    a control module for instructing a write access to said disk storage device; and
    a disk driver module for updating an ID value for each write command according to said write access instruction, inserting the ID value in a part or all of said write data, writing the data to a disk of said disk storage device, reading a part or all of said write data from said write-completed disk storage device according to the write completion of said disk storage device, storing the data to said memory, and comparing the ID value in said read data and said inserted ID value to detect a write miss of said disk storage device.

6. The data storage system according to claim 1, further comprising:
    a first interface section for controlling interface with said host; and
    a second interface section for controlling interface with said plurality of disk storage devices and is connected with said plurality of disk storage devices by said transmission paths.

7. The data storage system according to claim 1, wherein said controller inserts the ID value in a part or all of said write data stored to a cache area of said memory, writes the data to a disk of said disk storage device, reads a part or all of said write data from said write-completed disk storage device according to the write completion of said disk storage device, and stores the data to the data buffer area of said memory.

8. A storage control device, comprising:
a first interface section for controlling interface with a host;
a second interface section for controlling interface with a plurality of disk storage devices for storing data;
a controller for controlling access to said disk storage device; and
a memory for storing write data attached to a write command,
wherein said controller updates an ID value for each write command, inserts the ID value in a part or all of said write data, writes the data to a disk of said disk storage device, reads a part or all of said write data from said write-completed disk storage device according to the write completion of said disk storage device, stores the data to said memory, and compares the ID value in said read data and said inserted ID value to detect a write miss of said disk storage device.

9. The storage control device according to claim 8, wherein said controller inserts said ID value in a block ID in a data block of said write data.

10. The storage control device according to claim 8, wherein said controller inserts said ID value in at least one of a first and last block of write data to be written to said disk storage device, reads the first or last block of said write data from write-completed disk storage device, and stores the data in said memory.

11. The storage control device according to claim 8, wherein said controller inserts said ID value in all the blocks of write data to be written to said disk storage device, reads all the blocks of said write data from said write-completed disk storage device, and stores the data to said memory.

12. The storage control device according to claim 8, wherein said controller comprises:
a control module for instructing a write access to said disk storage device; and
a disk driver module for updating an ID value for each write command according to said write access instruction, inserting the ID value in a part or all of said write data, writing the data to a disk of said disk storage device, reading a part or all of said write data from said write-completed disk storage device according to the write completion of said disk storage device, storing the data to said memory, and comparing the ID value in said read data and said inserted ID value to detect a write miss of said disk storage device.

13. The storage control device according to claim 8, wherein said controller inserts the ID value in a part or all of said write data stored in a cache area of said memory, writes the data to a disk of said disk storage device, reads a part or all of said write data from said write-completed disk storage device according to the write completion of said disk storage device, and stores the data to the data buffer area of said memory.

14. A write error diagnosis method for a disk of a data storage system having a controller which is connected to a plurality of disk storage devices for storing data via transmission paths, and controls access to said disk storage devices according to an access instruction from a host, a first interface section for controlling interface with said host, and a second interface section for controlling interface with said plurality of disk storage devices, the method comprising steps of:
storing write data attached to a write command to a memory;
updating an ID value for each write command and inserting the ID value in a part or all of said write data;
writing said ID value-inserted write data to a disk of said disk storage device;
reading a part or all of said write data from the write-completed disk storage device according to the write completion of said disk storage device, and storing the data to said memory; and
comparing the ID value in said read data and said inserted ID value to detect a write miss of said disk storage device.

15. The write error diagnosis method for a disk of a data storage system according to claim 14, wherein said insertion step comprises a step of inserting said ID value in a block ID in a data block of said write data.

16. The write error diagnosis method for a disk of a data storage system according to claim 14, wherein said insertion step comprises a step of inserting said ID value in at least one a first and last block of write data to be written to said disk storage device,
and wherein said storage step comprises a step of reading the first or last block of said write data from said write-completed disk storage device, and storing the data to said memory.

17. The write error diagnosis method for a disk of a data storage system according to claim 14, wherein said insertion step comprises a step of inserting said ID value in all the blocks of write data to be written to said disk storage device,
and wherein said storage step comprises a step of reading all the blocks of said write data from said write-completed disk storage device, and storing the data to said memory.

18. The write error diagnosis method for a disk of a data storage system according to claim 14, wherein a control module of said controller instructs a write access to said disk storage device and a disk driver executes said insertion step, said step of writing the data to the disk of said disk storage device, said step of reading a part or all of said write data from said write-completed disk storage device according to the write completion of said disk storage device, and storing the data to said memory, and said step of detecting a write error of said disk storage device.

19. The write error diagnosis method for a disk of a data storage system according to claim 14, wherein said insertion step comprises a step of inserting the ID value in a part or all of said write data stored in a cache area of said memory,
and wherein said step of storing the data in said memory comprises a step of reading a part or all of said write data from said write-completed disk storage device, and storing the data to the data buffer area of said memory.

20. The write error diagnosis method for a disk of a data storage system according to claim 14, further comprising a step of selecting inserting said ID value in either a part or all of said write data.

\* \* \* \* \*